Aug. 23, 1938.   A. A. HEATON   2,127,516
PISTON EXPANDER
Filed Jan. 13, 1936
Fig. 1
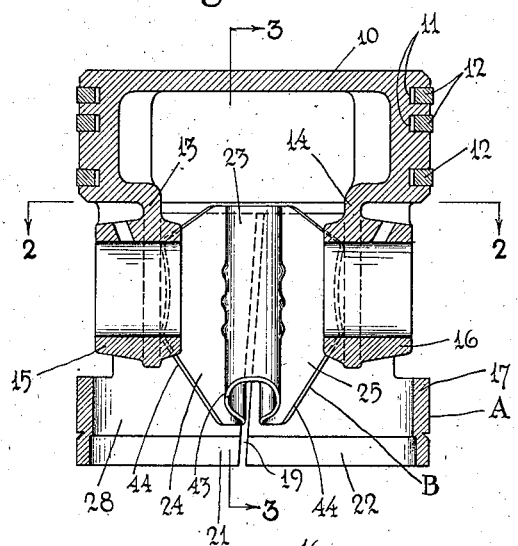
Fig. 3
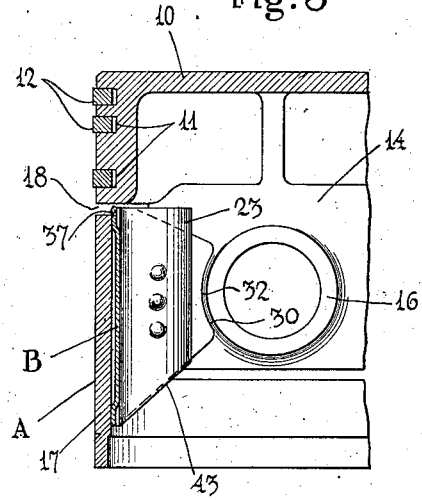
Fig. 4
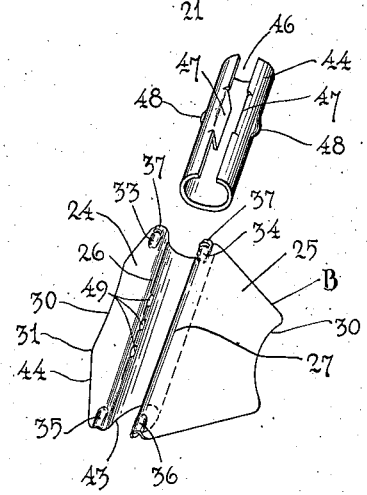
Fig. 2
Inventor
Arthur A. Heaton
By Caswell & Lagaard
Attorneys Patented Aug. 23, 1938

2,127,516

UNITED STATES PATENT OFFICE 2,127,516

PISTON EXPANDER

Arthur A. Heaton, Minneapolis, Minn.

Application January 13, 1936, Serial No. 58,795

3 Claims. (Cl. 309—12)

My invention relates to piston expanders and has for an object to provide an expander which will procure expansion of the piston in a manner to cause the piston when used in a worn cylinder to carry the desired compression and prevent piston slap without producing undue friction.

Another object of my invention resides in providing a piston expander which can be applied to a piston of the type having a split skirt and wrist pin bosses without removing the piston from its cylinder.

A still further object of the invention resides in providing an expander which restrains radial movement of the piston skirt inwardly and confines the movement solely to circumferential movement.

Another object of the invention resides in providing a piston expander which engages the piston skirt on adjacent sides of the slit and also engages the bosses of the piston.

An object of the invention resides in providing a piston expander constructed with two struts which reinforce the piston skirt.

A still further object of the invention resides in constructing the expander in the form of a V, the said struts forming the legs of the V and in providing at the apex of the V a looped spring portion serving to spread the struts apart at such locality.

A feature of the invention resides in constructing the struts with curved edges adapted to fit about the wrist pin bosses.

A still further object of the invention resides in utilizing an auxiliary spring member disposed within the looped spring member for exerting further pressure upon the piston skirt.

Other objects of the invention reside in the novel combination and arrangement of parts and in the details of construction hereinafter illustrated and/or described.

In the drawing:

Fig. 1 is a longitudinal sectional view of a piston taken through the wrist pin bosses and illustrating an embodiment of my invention.

Fig. 2 is a plan sectional view taken on line 2—2 of Fig. 1.

Fig. 3 is a fragmentary elevational sectional view taken on line 3—3 of Fig. 1.

Fig. 4 is a perspective view of the piston expander and auxiliary spring detached from the piston.

In the use of piston expanders, considerable difficulty has been encountered due to the fact that where a split skirt piston is used the skirt is considerably weaker at the slit than elsewhere and when pressure is applied the skirt yields radially and recedes from the piston wall at the locality of the slit. The present invention overcomes this objection in an extremely simple and practical manner, as will hereinafter become apparent.

For the purpose of illustrating the application of my invention, I have shown a conventional type of piston A which is constructed in accordance with the usual automotive practice. This piston comprises a piston head 10 which is constructed with grooves 11 extending circumferentially about the same and in which the usual piston rings 12 are disposed. Two struts 13 and 14 depend from the piston head 10 and have attached to them the usual wrist pin bosses 15 and 16 in which the wrist pin of the engine, not shown in the drawing, is journaled. The two struts 13 and 14 have attached to them a piston skirt 17 which is separated from the head 10 by means of a circumferentially extending slot 18 so that transmission of heat from the head 10 to the skirt 17 is greatly reduced. The skirt 17 is formed with a longitudinally extending slit 19 which divides the skirt into two parts 21 and 22, adjacent to said slit. The inner surface of the skirt is indicated by the reference numeral 28.

My improved piston expander is indicated in its entirety by the reference numeral B and is best shown in Fig. 4. The expander is constructed from spring sheet material which is bent to provide a central looped portion 23 and two wings 24 and 25 extending outwardly therefrom in diverging relation. These wings serve as struts as will hereinafter be more fully described and are arranged in the form of a V, the looped portion 23 being disposed at the apex of the V and the struts 24 and 25 forming the legs of the V. Where the struts 24 and 25 are connected to the looped portion 23 the structure is rounded or formed with return bends as designated at 26 and 27 to provide abutments or shoulders which engage the inner surface 28 of the piston skirt 17. The extreme edges 30 of the struts 24 and 25 are formed with arcuate notches 31 and 32 and fit up against the bosses 15 and 16 of the piston A when the expander is properly applied.

For the purpose of holding the piston expander in proper engagement with the piston, four raised portions, 33, 34, 35 and 36 are formed at the ends of the shoulders 26 and 27 which space the intermediate portions of the said shoulders away from the surface 28 of the piston skirt 17. This causes equal distribution of the pressure on the spring throughout the entire extent of the spring, thereby preventing unequal pressure as would be occasioned where an irregularly occurred on the surface of the piston skirt which would engage the spring intermediate its ends and hold the rest of the spring spaced from the piston skirt. The notches 31 and 32 serve to hold the expander in place when applied to the piston. To further assist in holding the expander in place the raised portions 33 and 34 are constructed with ears 37 struck out of the same, which ears engage within the slot 18 and hold the portion of the expander engaging the skirt from movement with respect thereto. This construction is best shown in Figs. 3 and 4.

The manner of installing the invention is as follows: The looped portion 23 is best shown in Fig. 2 and is so constructed that the shoulders 26 and 27 are closely positioned with respect to one another forming a sort of neck therebetween. This provides two recesses 41 and 42 adjacent the neck 38. In applying the device, a pair of round nose pliers are inserted into the two recesses 41 and 42 and the looped portion 23 drawn together at the neck 38. This brings the notched edges 31 and 32 of the struts 24 and 25 together and permits of inserting the device while held by the pliers inwardly onto the piston so as to permit of application of the expander to the bosses 15 and 16. Upon releasing the expander the same becomes lodged in position and a slight tapping of the expander with a hammer, screw driver or other tool will adjust the same so that the notches 31 and 32 fit snugly against the bosses 15 and 16 and so that the ears 37 become lodged in the slot 18. When the piston expander is so arranged, the same has been properly applied. The expander as previously stated, may be inserted into the pistons, where split skirt pistons are employed, without removing the pistons from the cylinder. This is accomplished by turning the crank shaft of the engine so that the connecting rod extends away from the split in the skirt of the piston. Sufficient room will then be found available for the insertion of the expander into the piston.

The struts 24 and 25 engage the bosses 15 and 16 at the corners formed between said bosses and the struts 13 and 14. These particular points of engagement are inwardly from the inner surface 28 of the piston skirt 17. At the same time the shoulders 26 and 27 engage the surface 28 adjacent the slit 19. The struts 24 and 25 hence reinforce the piston skirt at the locality of the slit 19 and restrain radial movement of the portions 21 and 22 of the skirt inwardly. Due to the resiliency of the looped portion 23, the expander functions to urge the portions 21 and 22 apart in a circumferential direction and thereby expand the piston skirt without throwing the same out of round.

To provide clearance for the connecting rod of the piston the lowermost edge 43, of the looped portion 23, as well as the edges 44 of the struts 24 and 25 are cut on a diagonal as shown in Fig. 3. This permits the connecting rod to swing to its extreme positions.

Where an exceedingly great amount of piston skirt expansion is desired, I provide an auxiliary spring 45, best shown in Fig. 4. This spring is constructed from sheet metal and is cylindrical in form, being provided with a slit 46 extending longitudinally thereof. The diameter of the spring 44 is somewhat greater than the internal diameter of the portion 23 of the piston expander B so that when the said spring is inserted within said looped portion, it exerts a pressure thereupon which complements the pressure exerted by the looped portion, whereby greater force is exerted on the piston skirt to spread the ends of the same apart.

For the purpose of facilitating the insertion of the auxiliary spring 45 into the looped portion 23 of the piston expander the said auxiliary spring is constructed with two inwardly extending ears 47. In the application of the spring into the looped portion 23, a pair of flat nosed pliers are inserted into the spring 44 and the two ears 47 forced together. This reduces the diameter of the spring and permits of the easy insertion of the same into the looped portion 23 of the expander.

The auxiliary spring 45 is constructed somewhat shorter than the looped portion 23 of spreader B. This spring is held in place within the looped portion 23 by means of two projections 48 formed upon the sides thereof which may be engaged in any of a number of corresponding depressions 49 formed in the looped portion 23 of the expander. By means of these depressions, the spring 44 can be held positioned either at one end or the other of the looped portion 23 or in the center of the same. In this manner the added pressure can be applied where most needed. Where the greatest pressure is desired at the lowermost portion of the skirt, the projections 48 are lodged in the lowermost depressions 49.

My invention is exceedingly simple in construction and may be manufactured at a nominal cost. The invention is easily and quickly applied to the piston of a motor vehicle and does not require drilling or machining of the piston for the purpose of installing the same thereon. The device may be easily installed while the pistons are within the cylinders without requiring removal thereof. With my invention different degrees of spring tension may be procured and the force exerted may be adjusted so that a greater force is exerted at one end of the piston skirt than at the other end. My expander is rigidly held in position so that the same cannot become disengaged from the piston. Due to the resiliency of the expander the piston skirt readily adapts itself to irregularities of the piston wall and thus prevents piston slap and provides the necessary compression in the cylinders. My invention does not appreciably increase the friction between the piston and cylinder walls.

Changes in the specific form of my invention, as herein disclosed, may be made within the scope of what is claimed without departing from the spirit of my invention.

Having described my invention, what I claim as new and desire to protect by Letters Patent is:

1. A piston expander for application to a piston having wrist pin bosses and a skirt slit longitudinally at a locality intermediate said bosses, said expander comprising two struts adapted to engage said bosses and to engage said skirt on opposite sides of the slit therein, a looped member connected to said struts at their ends adjacent said slit and a spring member within said looped member and urging the opposed portions thereof apart to expand the piston.

2. A piston expander for application interiorly of a piston between the wrist pin bosses thereof and constructed from resilient sheet material bent to provide two struts adapted to engage said bosses and an expansion formation therebetween comprising a loop extending inwardly of said struts and connected to said struts by means of spaced return bends, providing oppositely facing recesses adapted to be engaged by a tool for flexing said loop and drawing said return bends and the edges of said struts toward one another to facilitate insertion of the expander in position of use.

3. A piston expander for application interiorly of a piston, said expander comprising two struts adapted to engage the wrist pin bosses of the piston and an expansion formation between said struts, said expansion formation including a resilient loop open at one end and connected at its open end to the struts, said loop in proximity to said struts being formed with oppositely facing recesses adapted to be engaged by a tool for flexing said loop and reducing the opening of the open end of the loop, whereby the struts are drawn toward each other to facilitate insertion of the expander in position of use.

ARTHUR A. HEATON.